United States Patent
Bucchieri et al.

(10) Patent No.: US 9,595,015 B2
(45) Date of Patent: Mar. 14, 2017

(54) ELECTRONIC JOURNAL LINK COMPRISING TIME-STAMPED USER EVENT IMAGE CONTENT

(75) Inventors: Vittorio Bucchieri, Wakefield, MA (US); Manuela Zavattaro, London (GB); Kim Gronholm, Tampere (FI); Matt Turnbull, Kidderminster (GB); Nicola Plaisant, Ulm (DE); Josh Mitchelmore, London (GB)

(73) Assignee: Nokia Technologies Oy, Espoo (FI)

( * ) Notice: Subject to any disclaimer, the term of this patent is extended or adjusted under 35 U.S.C. 154(b) by 939 days.

(21) Appl. No.: 13/440,505

(22) Filed: Apr. 5, 2012

(65) Prior Publication Data
US 2013/0268828 A1 Oct. 10, 2013

(51) Int. Cl.
*G06Q 10/06* (2012.01)
*G06Q 50/00* (2012.01)
*G06F 17/30* (2006.01)
*G06F 3/048* (2013.01)

(52) U.S. Cl.
CPC ....... *G06Q 10/06* (2013.01); *G06F 17/30064* (2013.01); *G06F 17/30867* (2013.01); *G06Q 50/01* (2013.01)

(58) Field of Classification Search
CPC ............. G06F 17/2252; G06F 17/2235; G06F 17/211; G06F 17/30905; G06F 17/2247
USPC ....... 715/203–210, 704, 709, 716, 723, 730, 715/744, 745, 751, 789, 817, 844
See application file for complete search history.

(56) References Cited

U.S. PATENT DOCUMENTS

| | | | |
|---|---|---|---|
| 6,839,879 B1 * | 1/2005 | Hwang | 715/256 |
| 7,130,861 B2 * | 10/2006 | Bookman et al. | |
| 7,130,885 B2 * | 10/2006 | Chandra et al. | 709/206 |
| 7,194,419 B2 * | 3/2007 | Robertson et al. | 705/1.1 |
| 7,899,936 B2 * | 3/2011 | Fredriksson et al. | 709/248 |
| 7,970,793 B2 * | 6/2011 | Davia et al. | 707/793 |
| 7,984,114 B2 * | 7/2011 | Bankers et al. | 709/219 |
| 8,060,567 B2 * | 11/2011 | Carroll et al. | 709/206 |

(Continued)

FOREIGN PATENT DOCUMENTS

| | | |
|---|---|---|
| EP | 1531411 | 5/2005 |
| EP | 1847951 | 10/2007 |
| EP | 1988694 | 11/2008 |

OTHER PUBLICATIONS

Lyubomir Penev, Interlinking journal and wiki publications through joint citation: Working examples from ZooKeys and Plazi on Species-ID, Apr. 14, 2011, wiki publications through joint citation, 1-3.*

(Continued)

*Primary Examiner* — Scott Baderman
*Assistant Examiner* — Hassan Mrabi
(74) *Attorney, Agent, or Firm* — Locke Lord LLP

(57) ABSTRACT

An apparatus comprises at least one processor; and at least one memory including computer program code, the at least one memory and the computer program code configured to, with the at least one processor, cause the apparatus to perform at least the following: enable the creation of a discrete journal comprising time-stamped user event content taken from a plurality of user applications, the discrete journal relating to a discrete journal timeframe and wherein the time-stamped user event content has time-stamps within the discrete journal timeframe.

29 Claims, 7 Drawing Sheets

(56) References Cited

U.S. PATENT DOCUMENTS

| | | | |
|---|---|---|---|
| 8,200,808 B2* | 6/2012 | Ishida | 709/224 |
| 8,495,020 B1 | 7/2013 | Nasserbakht et al. | |
| 8,577,965 B2* | 11/2013 | Hymel et al. | 709/204 |
| 8,690,062 B1* | 4/2014 | Qureshi | 235/462.41 |
| 8,745,057 B1* | 6/2014 | Li | G06F 17/30247 707/737 |
| 8,843,446 B2 | 9/2014 | Ben-Or et al. | 707/640 |
| 2002/0068573 A1* | 6/2002 | Raverdy et al. | 455/445 |
| 2002/0078070 A1 | 6/2002 | Eshelman et al. | |
| 2002/0169769 A1 | 11/2002 | Jackson | |
| 2002/0198890 A1 | 12/2002 | Jackson | |
| 2003/0055983 A1 | 3/2003 | Callegari | |
| 2004/0078372 A1 | 4/2004 | Huuskonen | |
| 2004/0192343 A1* | 9/2004 | Toyama | 455/456.1 |
| 2004/0230371 A1* | 11/2004 | Vincent et al. | 701/200 |
| 2005/0064852 A1* | 3/2005 | Baldursson | 455/414.2 |
| 2005/0105396 A1 | 5/2005 | Schybergson | |
| 2005/0108644 A1* | 5/2005 | Finke-Anlauff et al. | 715/721 |
| 2005/0198305 A1* | 9/2005 | Pezaris et al. | 709/227 |
| 2005/0234905 A1* | 10/2005 | Endler et al. | 707/5 |
| 2006/0142023 A1* | 6/2006 | Lannerstrom | 455/456.1 |
| 2006/0156245 A1 | 7/2006 | Williams et al. | |
| 2007/0011613 A1* | 1/2007 | Lane et al. | 715/709 |
| 2007/0022174 A1* | 1/2007 | Issa | 709/217 |
| 2007/0060112 A1 | 3/2007 | Reimer | |
| 2007/0099657 A1 | 5/2007 | Scott | |
| 2007/0124673 A1 | 5/2007 | Trotto et al. | |
| 2007/0244634 A1 | 10/2007 | Koch et al. | |
| 2007/0261071 A1 | 11/2007 | Lunt et al. | |
| 2008/0021920 A1 | 1/2008 | Shapiro et al. | |
| 2008/0132251 A1* | 6/2008 | Altman et al. | 455/457 |
| 2008/0189357 A1 | 8/2008 | Prasad et al. | |
| 2008/0244704 A1 | 10/2008 | Lotter et al. | |
| 2008/0256460 A1 | 10/2008 | Bickmore | |
| 2008/0294663 A1 | 11/2008 | Heinley et al. | |
| 2008/0304431 A1* | 12/2008 | Karaoguz | 370/310 |
| 2009/0023428 A1* | 1/2009 | Behzad et al. | 455/414.3 |
| 2009/0043646 A1 | 2/2009 | Pingali et al. | |
| 2009/0070665 A1 | 3/2009 | Chijiiwa et al. | |
| 2009/0150574 A1 | 6/2009 | Kawahara et al. | |
| 2009/0164904 A1* | 6/2009 | Horowitz et al. | 715/723 |
| 2009/0187849 A1 | 7/2009 | Rhee et al. | |
| 2009/0204899 A1* | 8/2009 | Bennett | 715/730 |
| 2009/0210516 A1* | 8/2009 | Roskowski | 709/219 |
| 2010/0077289 A1* | 3/2010 | Das et al. | 715/230 |
| 2010/0082237 A1 | 4/2010 | Black | |
| 2010/0132023 A1 | 5/2010 | Reese et al. | |
| 2010/0153433 A1 | 6/2010 | Mumford | |
| 2010/0169411 A1* | 7/2010 | Colton et al. | 709/203 |
| 2010/0269049 A1 | 10/2010 | Fearon | |
| 2011/0145275 A1 | 6/2011 | Stewart | |
| 2011/0231778 A1* | 9/2011 | Hoag et al. | 715/745 |
| 2011/0252057 A1 | 10/2011 | Huang et al. | |
| 2011/0270836 A1 | 11/2011 | Yang et al. | |
| 2011/0314482 A1 | 12/2011 | Cupala et al. | |
| 2012/0099800 A1* | 4/2012 | Llano et al. | 382/224 |
| 2012/0099842 A1* | 4/2012 | Yasuda | 386/278 |
| 2012/0124125 A1 | 5/2012 | Smith et al. | |
| 2012/0128323 A1* | 5/2012 | Sigvaldason | 386/241 |
| 2012/0150929 A1* | 6/2012 | Xie et al. | 707/825 |
| 2012/0201511 A1* | 8/2012 | Sigvaldason | 386/241 |
| 2012/0203794 A1 | 8/2012 | Zhang et al. | |
| 2012/0265758 A1* | 10/2012 | Han et al. | 707/737 |
| 2013/0073976 A1* | 3/2013 | McDonald | G06Q 10/00 715/739 |
| 2013/0132836 A1* | 5/2013 | Ortiz | 715/716 |
| 2013/0191470 A1 | 7/2013 | Geraci et al. | |
| 2013/0198602 A1* | 8/2013 | Kokemohr | 715/233 |
| 2013/0238964 A1* | 9/2013 | Perrodin et al. | 715/209 |
| 2013/0239030 A1* | 9/2013 | Cunningham et al. | 715/764 |
| 2013/0239049 A1* | 9/2013 | Perrodin et al. | 715/800 |

OTHER PUBLICATIONS www.snapfish.com, downloaded Dec. 19, 2013, 2 pages.

International Search Report for International Application No. PCT/IB2013/052708—Date of Completion of Search: Nov. 26, 2013, 7 pages.

Written Opinion of the International Searching Authority for International Application No. PCT/IB2013/052708—Date of Completion of this Opinion—Nov. 26, 2013, 6 pages.

Supplementary European Search Report of EP Application No. EP13772173—Date of Completion of the Search: Oct. 19, 2015, 2 pages.

International Search Report for International Application No. PCT/IB2013/052706, Dated Nov. 15, 2013, 4 pages.

* cited by examiner

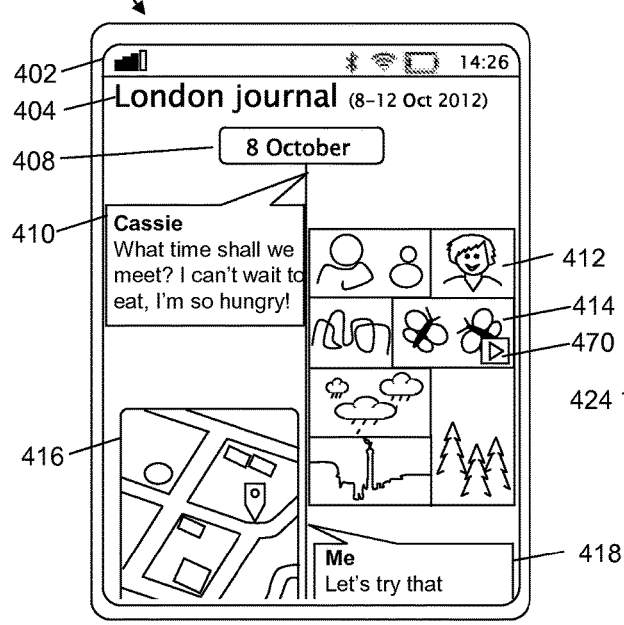
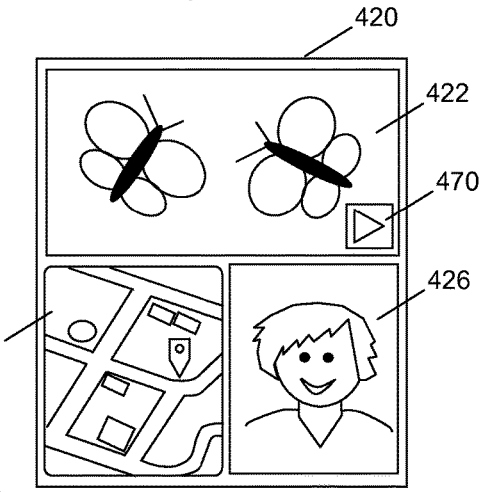
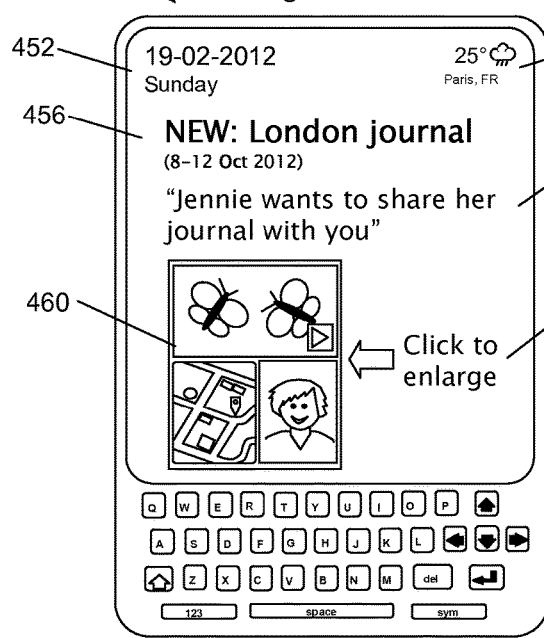
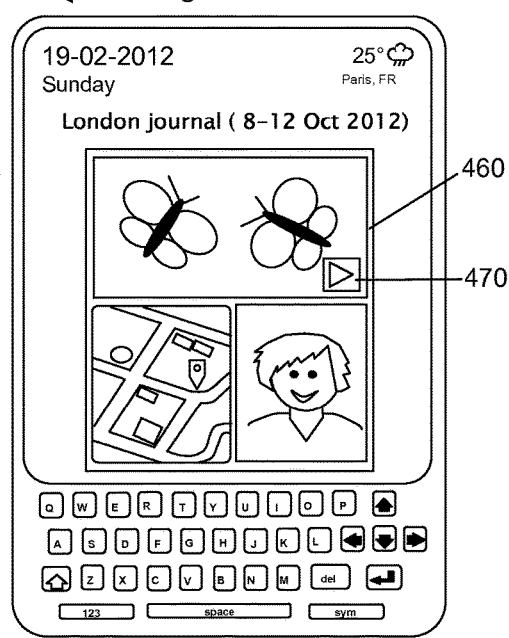

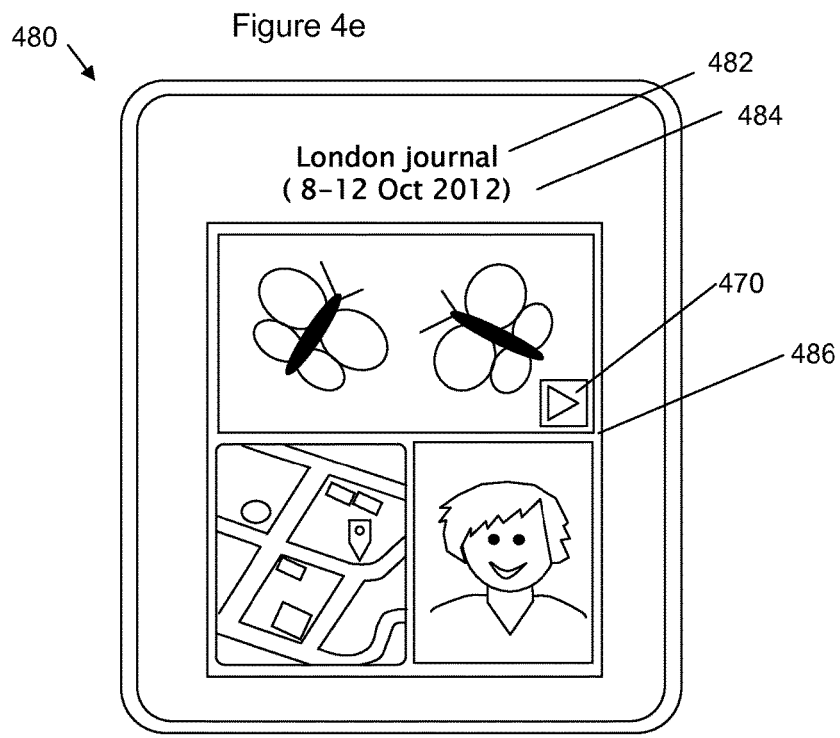
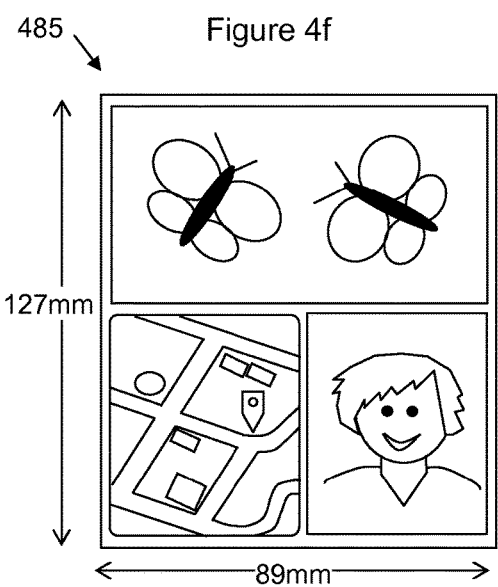
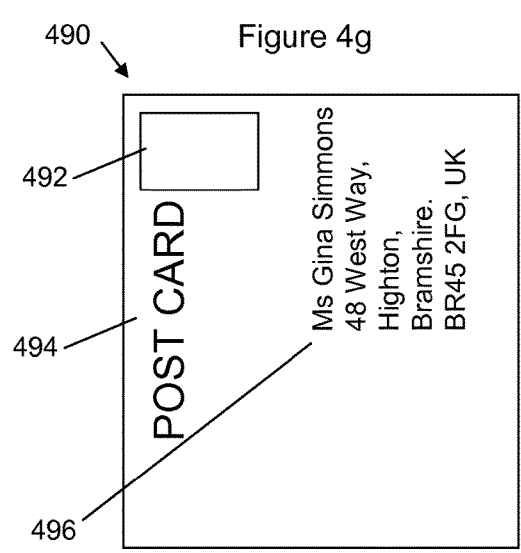

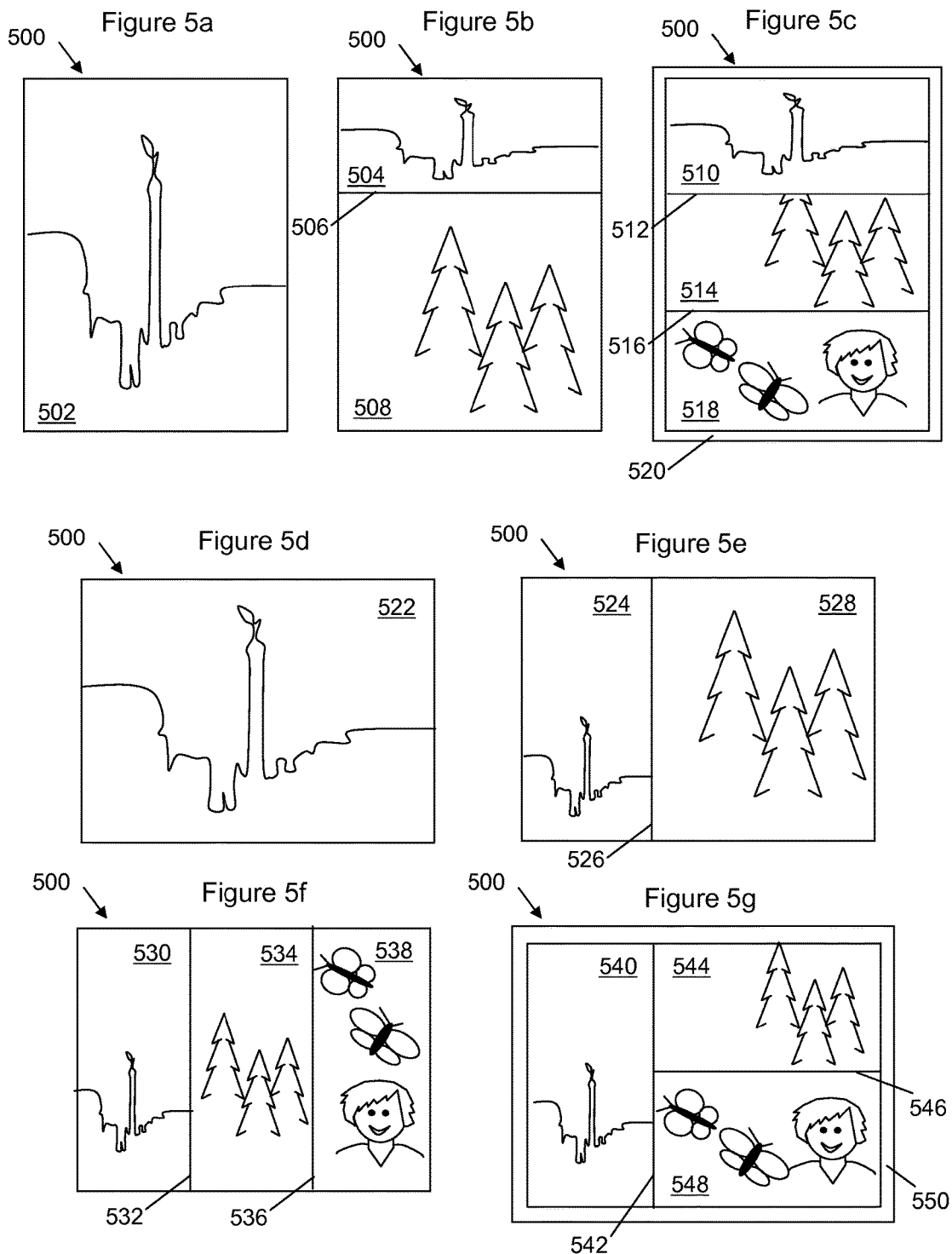

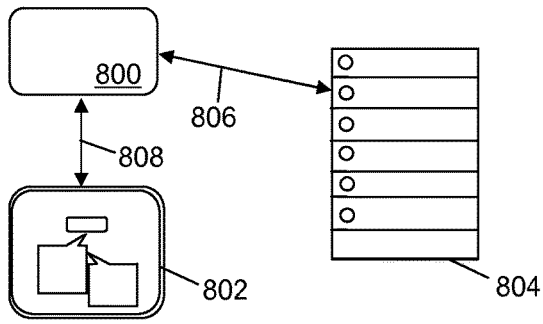
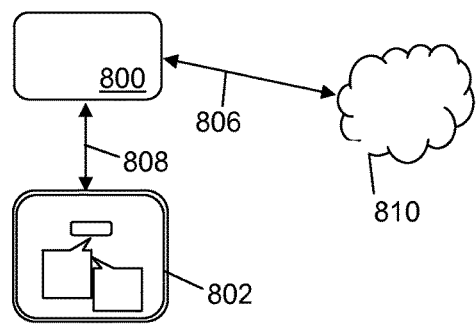

Figure 9

Creating a journal link for a recipient of the journal link, the journal link configured to provide an electronic link to a particular discrete journal, the particular discrete journal relating to a discrete journal timeframe and comprising time-stamped user event image content with time-stamps within the discrete journal timeframe, wherein the journal link is itself formed from at least one of the time-stamped user event image content from the particular discrete journal for which the journal link is configured to provide an electronic link.      902

Figure 10

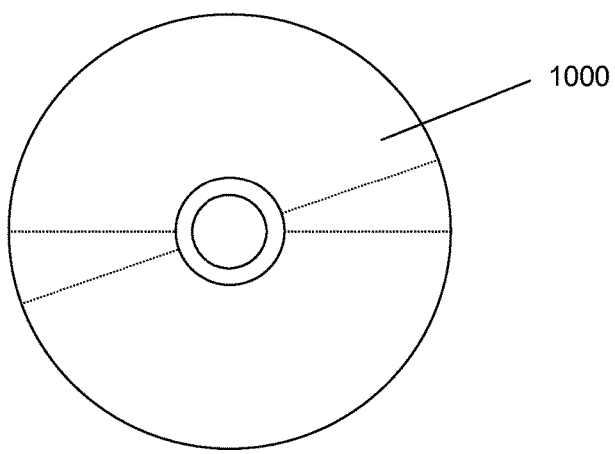

ELECTRONIC JOURNAL LINK COMPRISING TIME-STAMPED USER EVENT IMAGE CONTENT

TECHNICAL FIELD

The present disclosure relates to the field of organising user event content associated with a plurality of user applications, associated methods, computer programs and apparatus. Certain disclosed aspects relate to portable electronic devices, in particular, so-called hand-portable electronic devices which may be hand-held in use (although they may be placed in a cradle in use). Such hand-portable electronic devices include so-called Personal Digital Assistants (PDAs) and tablet personal computers.

The portable electronic devices/apparatus according to one or more disclosed aspects may provide one or more audio/text/video communication functions (e.g. tele-communication, video-communication, and/or text transmission (Short Message Service (SMS)/Multimedia Message Service (MMS)/e-mailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Electronic devices, such as a home computers and mobile telephones, may be used for many purposes through the use of different user applications. For example, a user of a mobile telephone may take photographs, record movies, compose text messages and e-mails, play games, and access the internet, all using the mobile telephone and a range of applications. Many other tasks may be performed using the mobile telephone and appropriate user applications/software.

When the user creates content, by taking a new photo or composing a new e-mail, for example, the time and/or date when the content was created may be stored. Thus each item of user content may be time-stamped according to when it was created and/or updated. For example, if a user takes a photo with a digital camera, the photo may be stored alongside the time and date when the photo was taken. A user may have a collection of many items of user content of different types, perhaps relating to a particular period of time, and the user may wish to share that content with a friend.

The listing or discussion of a prior-published document or any background in this specification should not necessarily be taken as an acknowledgement that the document or background is part of the state of the art or is common general knowledge.

SUMMARY

In a first aspect, there is provided an apparatus, the apparatus comprising:
    at least one processor; and
    at least one memory including computer program code, the at least one memory and the computer program code configured to, with the at least one processor, cause the apparatus to perform at least the following:
    enable the creation of a journal link for a recipient of the journal link, the journal link configured to provide an electronic link to a particular discrete journal, the particular discrete journal relating to a discrete journal timeframe and comprising time-stamped user event image content with time-stamps within the discrete journal timeframe,
    wherein the journal link is itself formed from at least one of the time-stamped user event image content from the particular discrete journal for which the journal link is configured to provide an electronic link.

The (discrete) journal may be thought of as an electronic collection of items (such as, for example, e-mails, photographs, movies, calendar entries, location logs and new contacts) which can be displayed together to provide a memento of a particular period of time in the user's life. User event image content is included, for example, photographs, still images from movies/videos, an image of an e-mail or document, and screenshots etc.

The term "discrete journal" indicates that the journal relates to a particular period of time, that is, a discrete timeframe. Such a particular period/discrete timeframe may be one year, a school term, a weekend, or a three week holiday, for example. A user may create/keep many discrete journals over the course of their lifetime (or the course of their lifetime using electronic devices to record content associated with user events).

A "journal link" may be considered, therefore, as a way for a recipient of the journal link (e.g. a friend of the user) to provide an electronic link to the particular discrete journal associated with that journal link. The electronic/journal link can be considered to provide for an electronic preview or taster of the journal content, and may allow the recipient to see the user event image content, or see a preview of the user event image content, of the associated particular discrete journal. The journal link is itself formed from time-stamped user event content from the journal.

Time-stamped user event image content is image-based content related to an event in a user's life which has an associated time-stamp. For example, a user may record their current location using a GPS-enabled smartphone. The user's location provides content (which may be the GPS coordinates, or latitude/longitude, for example). If the user's location were to be displayed on a map, then that map, marking the user's location, could be considered to be user event image content. The location of the user at that particular place on the map will be recorded at a particular time and date, and so the recorded location will have an associated time-stamp according to when that location was logged/recorded.

The journal link may itself be formed from at least a portion of one or more of the time-stamped user event image content from the particular discrete journal for which the journal link is configured to provide an electronic link. For example, a portion of a photograph (such as a zoomed-in view of a person's face) in the particular discrete journal may be used to form the journal link. As another example, two photographs in the particular discrete journal may be displayed together to form the journal link.

The particular discrete journal may comprise the time-stamped user event image content taken from a plurality of user applications. For example, a particular discrete journal may contain movies recorded using a movie capture application, photographs taken using a photograph application, maps showing stored user locations, screenshots taken while the user was playing a game, and a screenshot of a PDF document produced by the user.

A particular discrete journal may also contain user event content which would not be considered to be user event image content per se, for example, sound files An image used to represent a sound file could be user event image content (e.g. an album cover related to a playlist included in the journal, an icon representing a sound file, or a wave/trace type image representing a sound). Text-based content such as editable word processing documents, e-mails and SMS messages; playlists in a music player application; bookmarks of web pages, documents and e-books; contact information, and calendar entries could be considered to be image content. In certain examples, if a screenshot or a PDF image was recorded of such text-based content, then the screenshot or PDF image would then provide an image which would be considered to be user event image content.

The journal link may itself be formed from a plurality of the time-stamped user event image content from the particular discrete journal for which the journal link is configured to provide an electronic link. For example, a photograph and a still from a movie in the discrete journal may be put together/compiled to provide a journal link.

The journal link may itself be formed from one or more of: a plurality of, and respective portions of a plurality of, the time-stamped user event image content from the particular discrete journal for which the journal link is configured to provide an electronic link. For example, a zoomed-in view of a screenshot, a portion of a photograph, and a movie still may be put together to form the journal link (when considering portions of image content).

The particular discrete journal may comprise the time-stamped user event image content taken from a plurality of user applications, the particular discrete journal relating to a discrete journal timeframe and comprising the time-stamped user event image content with time-stamps within the discrete journal timeframe. The journal link may itself be formed from a plurality of the time-stamped user event image content from the particular discrete journal for which the journal link is configured to provide an electronic link.

The journal link may comprise a single framed image compiled from one or more of the time-stamped user event image content or respective portions thereof. The compiled single framed image may be non-editable (i.e. in a non-editable electronic format) as received by a recipient. For example, a user may put three photographs taken from a particular discrete journal together as a single composite image, the composite image being the journal link. This single composite image journal link may be saved and transmitted (via e-mail or MMS message, or uploaded to a social media website, for example) to a recipient. The recipient may not be able to edit the composite image or the constituent three photographs which were used to create the composite image/journal link, for example, to separate out the three photographs. The elements of the composite image may be considered to be grouped together as a single object/frame.

The journal link, once formed, may be configured to be non-editable. That is, the journal link may be created and saved as, for example, a .jpg, .tif, .pdf, or .bmp file. This file is not able to be edited in the sense that, for example, one of the framed photographs in the journal link could not easily be re-framed (that is, any content outside the frame is no longer available after saving the journal link, so that the image cannot be re-framed after saving). Also for example, it would not be trivial to replace one of the items of user event image content with another item, or to add or take away an item of user event image content from the journal link. The respective content items of the journal link would not be considered as discrete editable items, but grouped together as a single item The journal link may be thought of as an electronic postcard, giving the recipient a preview/taster of the user's discrete journal. This may be considered analogous to a user going on holiday, and sending a traditional shop-bought postcard through the mail to a friend to show a neat preview image (or often a group of images) of where the user is on holiday. The content of the electronic postcard/journal link relates directly to the content which the user has captured during the journal timeframe of the discrete journal, and therefore may provide a more personalised taster of the user's holiday experience. The journal link may also be transmitted electronically, thus the recipient receives the journal link much quicker than they would have received a postcard in the post (and the cost of transmission would likely be included in the user's standard tariff for data transmission). By creating and transmitting a journal link, the user is able to quickly create a personalised preview (consolidated) image representing their holiday (or concert, weekend with friends, or other event) to share with friends.

The journal link may comprise a single framed image compiled from a plurality of the time-stamped user event image content or respective portions thereof. The plurality of the time-stamped user event image content, or respective portions thereof, may be arranged adjacent to one another in portrait or landscape format. For example, two photographs in portrait format (which may be portions of the photographs, or the full photographs) may be arranged side-by-side to make a composite image in landscape format for the journal link.

The journal link may comprise a single framed image compiled from one or more of the time-stamped user event image content or respective portions thereof, with a defined border around the perimeter of the frame, the defined border acting as a defined visual frame for the time-stamped user event image content contained therein. A defined border may be located around the periphery of the composite image created by the combination of the one or more items of user event image content, for example to create a stronger impression of a single composite image for the journal link.

The journal link may comprise a single framed image compiled from one or more of the time-stamped user event image content or respective portions thereof, and the journal link may be configured to be at least one of automatically displayed on an electronic device in a standard postcard size or automatically printed by a printer in a standard postcard size. A standard postcard size in the US as defined by the US Postal Service is 3½" (89 mm)-4½" (108 mm) high by 5" (127 mm)-6" (152 mm) long. A standard postcard size in the UK may be considered to be 105 mm high by 148 mm wide. There are many definitions of a standard postcard size depending on the territory and the era. For example, 100 years ago, the size of a standard postcard in the UK was different to the size of a standard postcard now.

The apparatus may be configured to enable the entry of a postal address to be included on the reverse of the printed compiled single framed image to allow for postal delivery of the printed compiled single framed image as a printed standard postcard-size journal link. The apparatus may be able to print out (or provide for printing of) the journal link (as a single framed image) with the framed user event image content on one side, and the postal address of a recipient (and possibly a user-created message) on the other side, so that the printed journal link may be posted to the recipient in a similar way as a traditional postcard would be.

The apparatus may be configured to enable annotation of the journal link to create an annotated journal link. Annotation of the journal link may comprise including one or more of a title, a date, a time, a textual message, a sender name, a recipient name, a sender avatar, and a recipient avatar with the journal link. Thus, the user may be able to compile items (or take one item) of user event image content and create a journal link, and then add annotation to annotate the journal link. Such annotation may include a short textual title message such as "London Break" or "Beyoncé in concert!", a sender name/textual message such as "from Becky", a recipient name/textual message such as "Hey Dave!", a sender/recipient avatar such as an avatar representing the user's/recipient's presence electronically (such as a profile image taken from a social media account, or which the user/recipient has set up to be their mobile telephone or contact card avatar image).

The electronic link to the particular discrete journal may be non-actuable, and may be configured to not provide a link to access the time-stamped user event image content using an electronic device at a location remote to where the time-stamped user event image content of the particular discrete journal is stored. That is, if a recipient electronically receives a journal link, the recipient is able to view the journal link, but, for example, would not be allowed to access the user's journal using the journal link, or access the user's photo album containing the photos used in the journal link.

The electronic link to the particular discrete journal may be actuable, and actuation of the electronic link by a recipient may allow the recipient to access one or more of:
  the time-stamped user event image content; and
  the particular discrete journal with which the journal link is associated;
using an electronic device at a location remote to where the time-stamped user event image content of the particular discrete journal is stored. Thus, for example, a recipient of an electronic journal link (e.g. located remote to where the journal/content is stored) may be able to click on the journal link to actuate the link and thereby access the journal of the user which the journal link relates to. As another example, the recipient may be able to click on a movie still used to create the journal link, and upon clicking on (actuating) the movie still, the originating movie is played for the recipient. As another example, if the recipient clicks on/actuates a screenshot for an online game included in the journal link, then the recipient may be presented with an internet browser displaying the online game webpage so that the recipient can themself play the game.

The apparatus may be configured to enable the creation of the journal link by presenting one or more of the time-stamped user event image content from the particular discrete journal for selection by a user according to a predetermined selection criterion, and the apparatus may be configured to form the journal link from the selected time-stamped user event image content.

The predetermined selection criterion for presentation of one or more of the time-stamped user event image content for selection by a user to create a journal link may comprise:
  presentation of the most recently available time-stamped user event image content in the particular discrete journal;
  presentation of the most viewed time-stamped user event image content in the particular discrete journal; and
  presentation of time-stamped user event image content designated as favourite time-stamped user event image content in the particular discrete journal.

The most recently available time-stamped user event content may be, for example, the last 10 photographs recorded having a time-stamp within the journal timeframe of the particular discrete journal, or may be the last 20 recorded items of user event image content having time-stamps within the journal timeframe of the particular discrete journal. The most viewed time-stamped user event content may be the photographs, movies, and maps which the user has selected to view in the journal (such as a favourite photo or a memorable movie). Favourite time-stamped user event content may be designated as "favourite" by the user electronically marking their favourite content, for example, by choosing a "select as favourite" option in a menu associated with a particular item of user event image content.

The apparatus may be configured to enable the automatic compilation of the time-stamped user event image content from the particular discrete journal to form the journal link according to a predetermined compilation criterion.

The predetermined compilation criterion may comprise:
  compiling a preset number of the time-stamped user event image content from the particular discrete journal;
  compiling the time-stamped user event image content from the particular discrete journal in a preset layout;
  consideration of the content of the time-stamped user event image content from the particular discrete journal; and
  consideration of an associated geographical location for the time-stamped user event image content from the particular discrete journal.

A preset number of time-stamped user event content may be a preset number of, for example, three items to be used to form the journal link. Of course, the preset number may be one, two, four, or more items. The preset layout may be, for example, three portrait-oriented strips forming a landscape-oriented journal link. Many different preset layouts may be envisaged.

Consideration of the content may be, for example, selection of only photographs to be put together to form the journal link. Another example may be to automatically include photographs in which particular contacts have been detected by the apparatus via, for example, facial recognition software. Another example may be to present content designated as favourite content before presenting other non-favourite content for inclusion in the journal link.

Consideration of an associated geographical link may be, for example, selecting content which is detected by the apparatus as having a feature closely associated with a particular location. For example, for a journal entitled "Visit to Paris", maps showing locations in Paris, and photographs labelled with the name "Paris" may be considered for inclusion in the journal link.

The apparatus may be configured to enable the creation of the journal link by presenting one or more of the time-stamped user event image content from the particular discrete journal for editing by a user, and the apparatus may be configured to form the journal link from the edited one or more of the time-stamped user event image content. Such editing may include, for example, framing, cropping, changing the colour balance, red-eye reduction, or adding an artistic effect, to one or more items of user event image content used in the journal link.

The time-stamped user event image content may comprise user generated content. That is, the time-stamped user event content may comprise photographs and movies taken by the user (using an in-built camera of an electronic device comprising the apparatus), for example.

The time-stamped user event image content may comprise one or more of:
  a pre-stored image;

a user-captured photograph;
a user-captured movie still;
a user-captured screenshot;
a map image of a geographical location;
a user-captured photograph of geographical scenery; and
a map image of a geographical location associated with a user-captured
photograph of geographical scenery.

The journal link may be configured to be uploadable to a social media service. Thus the user may wish to upload the journal link to their social media homepage, or to their blog, or link to it via a microblog entry, for sharing the journal link with their online social media contacts/blog readers.

The apparatus may be configured to enable the creation of the journal link for onward transmission to the recipient by one or more of an MMS transmission, e-mail transmission, Bluetooth® transmission, NFC transmission, WLAN transmission, radio wave transmission and cellular radio transmission.

The apparatus may be configured such that the journal link comprises one or more interactive elements. The one or more interactive elements of the journal link may comprise one or more of:
time-stamped user event image content which is a movie still, wherein user interaction with the movie still causes the originating movie to be played;
time-stamped user event image content having an associated geographical location, wherein user interaction with the time-stamped user event image content causes a (interactive and/or full) map of the associated geographical location to be displayed;
annotation of the journal link comprising an interactive journal tag, wherein user interaction with the interactive journal tag causes the user to view (and in some examples, interact with) the corresponding particular discrete journal associated with the annotated journal link; and
annotation of the journal link comprising a sender link, wherein user interaction with the sender link causes a message-to-sender user interface to become available, and the user may be able to compose and transmit (and thus interact with) a message to the sender of the journal link using the message-to-sender user interface.

The apparatus may be a portable electronic device, a mobile telephone, a smartphone, a tablet computer, a personal digital assistant, a laptop computer, a media player, a non-portable electronic device, a desktop computer, a server, or a module/circuitry for one or more of the same.

In another aspect, there is provided a method, the method comprising:
creating a journal link for a recipient of the journal link, the journal link configured to provide an electronic link to a particular discrete journal, the particular discrete journal relating to a discrete journal timeframe and comprising time-stamped user event image content with time-stamps within the discrete journal timeframe,
wherein the journal link is itself formed from at least one of the time-stamped user event image content from the particular discrete journal for which the journal link is configured to provide an electronic link.

In another aspect, there is provided a method, the method comprising:
enabling the creation of a journal link for a recipient of the journal link, the journal link configured to provide an electronic link to a particular discrete journal, the particular discrete journal relating to a discrete journal timeframe and comprising time-stamped user event image content with time-stamps within the discrete journal timeframe,
wherein the journal link is itself formed from at least one of the time-stamped user event image content from the particular discrete journal for which the journal link is configured to provide an electronic link.

In another aspect there is provided a computer readable medium comprising computer program code stored thereon, the computer readable medium and computer program code being configured to, when run on at least one processor, perform at least the following:
enable the creation of a journal link for a recipient of the journal link, the journal link configured to provide an electronic link to a particular discrete journal, the particular discrete journal relating to a discrete journal timeframe and comprising time-stamped user event image content with time-stamps within the discrete journal timeframe,
wherein the journal link is itself formed from at least one of the time-stamped user event image content from the particular discrete journal for which the journal link is configured to provide an electronic link.

The computer program may be stored on a storage media (e.g. on a CD, a DVD, a memory stick or other non-transitory medium). The computer program may be configured to run on a device or apparatus as an application. An application may be run by a device or apparatus via an operating system.

In another aspect, there is provided an apparatus, the apparatus comprising:
means for enabling the creation of journal link for a recipient of the journal link, the journal link configured to provide an electronic link to a particular discrete journal, the particular discrete journal relating to a discrete journal timeframe and comprising time-stamped user event image content with time-stamps within the discrete journal timeframe,
wherein the journal link is itself formed from at least one of the time-stamped user event image content from the particular discrete journal for which the journal link is configured to provide an electronic link.

The present disclosure includes one or more corresponding aspects, examples or features in isolation or in various combinations whether or not specifically stated (including claimed) in that combination or in isolation. Corresponding means and corresponding functional units (e.g. discrete journal creator, discrete journal creation enabler, timestamp recorder, journal link creator/enabler, user event image content collator) for performing one or more of the discussed functions are also within the present disclosure.

Corresponding computer programs for implementing one or more of the methods disclosed are also within the present disclosure and encompassed by one or more of the described examples.

BRIEF DESCRIPTION OF THE FIGURES

A description is now given, by way of example only, with reference to the accompanying drawings, in which:

FIGS. 4a-4g illustrate a particular discrete journal, a journal link created from content in the journal, and sharing of the journal link electronically and via printing out the journal link;

FIGS. 5a-5g illustrate different journal link layouts, including frames;

FIGS. 8a-8b shows the apparatus in communication with a remote server or cloud;

FIG. 9 illustrates an example method according to the present disclosure; and

FIG. 10 illustrates schematically a computer readable medium providing a program.

DESCRIPTION OF EXAMPLE ASPECTS

Figure 1:
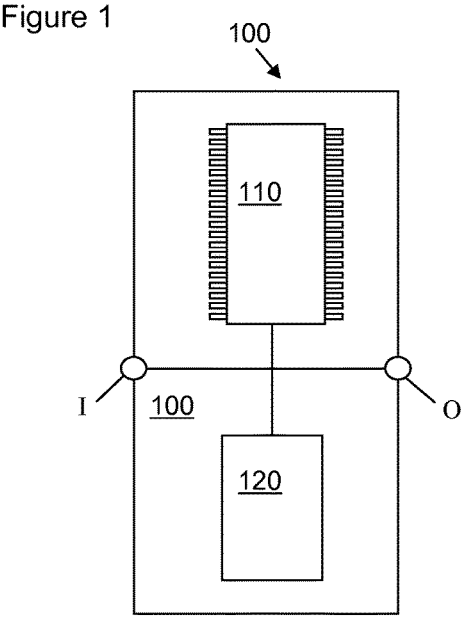
FIG. 1 illustrates an example apparatus according to the present disclosure.

Other examples depicted in the figures have been provided with reference numerals that correspond to similar features of earlier described examples. For example, feature number 100 can also correspond to numbers 200, 300, 400, etc. These numbered features may appear in the figures but may not have been directly referred to within the description of these particular examples. These have still been provided in the figures to aid understanding of the further examples, particularly in relation to the features of similar earlier described examples.

A journal may be considered to be a collection of records of events occurring within a particular period of a user's life. A journal (a diary) in the traditional sense may be thought of as a book in which a user writes about events happening in their life so that they have a record/memento of what they have done. A user may choose to stick photographs, concert tickets, notes and postcards, for example, into a traditional journal so the user has a scrapbook-like record, often in approximate date order, of events that have happened to them in their life.

Modern electronic devices can record content from many different sources. For example, a smartphone may be able to record photographs and movies, send/transmit SMS, MMS and e-mail messages, allow access to one or more social networking sites so that a user can update and view their profile, allow access to the internet, allow a user to play games, update and view an address book of contacts, and provide a user with other functionality. These different functionalities are associated with different user applications. Content is often recorded with an associated time stamp to show when the content was created and/or modified.

A user may create an electronic journal using an apparatus by collecting time-stamped user event content taken from a plurality of user applications together. The user may group together photographs, movies, e-mails, messages, music playlists, bookmarks, new contacts and other user event content together in a journal to provide a memento of a particular event. The event lasts for a defined period of time (the journal timeframe), so the user event content representing that event within the journal would have time-stamps within the timeframe of the journal.

A user may wish to share the content of a particular journal with one or more contacts, or at least share the fact of his or her experience associated with the journal content. For example, if the user has created a journal for a recent beach holiday, they may wish to share content recorded in a journal of the holiday. The user may wish to send a selection of their favourite photos, for example, taken during the holiday to their friends.

Traditionally, a person on holiday may buy a postcard from a local shop. Such postcards often contain photos of famous landmarks and scenes of the area. The person can write a personalised message on the back of the postcard, and post it to a friend. Electronically, the user may be able to send a selection of their own photographs (and other image content) from a journal as a journal link to many friends, from their mobile telephone (for example), and the friends would receive the user's journal link very quickly (typically less than a few minutes). It may also be more convenient to send an electronic postcard/journal link to friends than a traditional postcard, if on holiday in a remote area, for example. Of course, the journal link need not relate to a holiday, and it could reflect the content of a journal relating to, for example, a wedding, concert, party, college/school event, a visit to an exhibition, or any other event (whether it is a momentous event or not) which the user has recorded as a journal.

FIG. 1 shows an apparatus 100 comprising a processor 110, memory 120, input I and output O. In this example only one processor and one memory are shown but it will be appreciated that other examples may utilise more than one processor and/or more than one memory (e.g. same or different processor/memory types). The apparatus 100 may be an application specific integrated circuit (ASIC) for a portable electronic device. The apparatus 100 may also be a module for a device, or may be the device itself, wherein the processor 110 is a general purpose CPU and the memory 120 is general purpose memory.

The input I allows for receipt of signalling to the apparatus 100 from further components. The output O allows for onward provision of signalling from the apparatus 100 to further components. In this example the input I and output O are part of a connection bus that allows for connection of the apparatus 100 to further components. The processor 110 is a general purpose processor dedicated to executing/processing information received via the input I in accordance with instructions stored in the form of computer program code on the memory 120. The output signalling generated by such operations from the processor 110 is provided onwards to further components via the output O.

The memory 120 (not necessarily a single memory unit) is a computer readable medium (such as solid state memory, a hard drive, ROM, RAM, Flash or other memory) that stores computer program code. This computer program code stores instructions that are executable by the processor 110, when the program code is run on the processor 110. The internal connections between the memory 120 and the processor 110 can be understood to provide active coupling between the processor 110 and the memory 120 to allow the processor 110 to access the computer program code stored on the memory 120.

In this example the input I, output O, processor 110 and memory 120 are electrically connected internally to allow for communication between the respective components I, O, 110, 120, which in this example are located proximate to one another as an ASIC. In this way the components I, O, 110, 120 may be integrated in a single chip/circuit for installation in an electronic device. In other examples, one or more or all of the components may be located separately (for example, throughout a portable electronic device such as devices 200, 300, or within a network such as a "cloud" and/or may provide/support other functionality).

Figure 2:
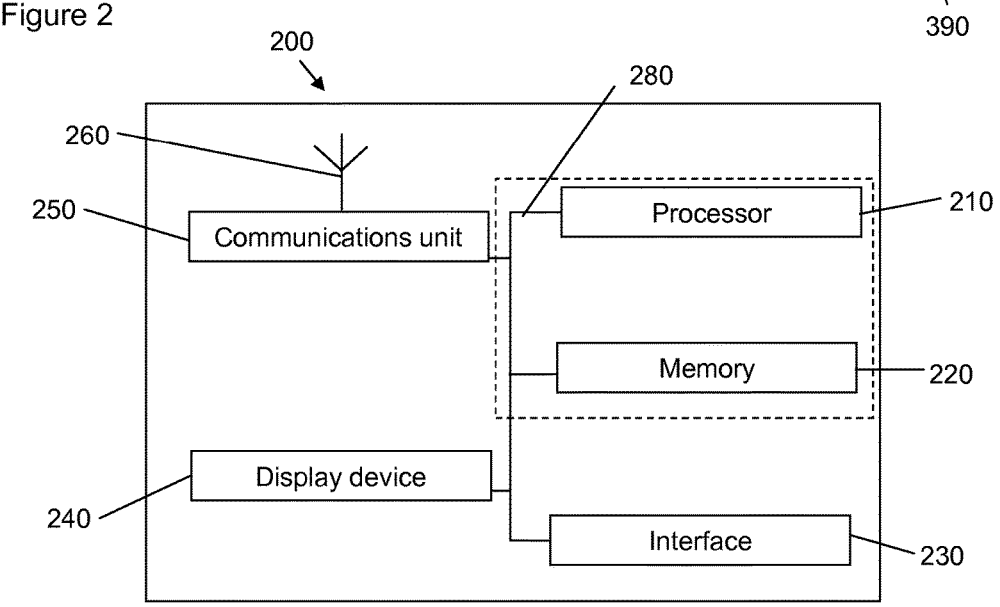
FIG. 2 illustrates another example apparatus according to the present disclosure.

One or more examples of the apparatus 100 can be used as a component for another apparatus as in FIG. 2, which shows a variation of apparatus 100 incorporating the functionality of apparatus 100 over separate components. In other examples the device 200 may comprise apparatus 100 as a module (shown by the optional dashed line box) for a mobile phone or PDA or audio/video player or the like. Such a module, apparatus or device may just comprise a suitably configured memory and processor.

The example apparatus/device 200 comprises a display 240 such as, a Liquid Crystal Display (LCD), e-Ink, or touch-screen user interface (like a tablet PC). The device 200 is configured such that it may receive, include, and/or otherwise access data. For example, device 200 comprises a communications unit 250 (such as a receiver, transmitter, and/or transceiver), in communication with an antenna 260 for connection to a wireless network and/or a port (not shown). Device 200 comprises a memory 220 for storing data, which may be received via antenna 260 or user interface 230. The processor 210 may receive data from the user interface 230, from the memory 220, or from the communication unit 250. Data may be output to a user of device 200 via the display device 240, and/or any other output devices provided with apparatus. The processor 210 may also store the data for later user in the memory 220. The device contains components connected via communications bus 280.

The communications unit 250 can be, for example, a receiver, transmitter, and/or transceiver, that is in communication with an antenna 260 for connecting to a wireless network and/or a port (not shown) for accepting a physical connection to a network, such that data may be received via one or more types of network. The communications (or data) bus 280 may provide active coupling between the processor 210 and the memory (or storage medium) 220 to allow the processor 210 to access the computer program code stored on the memory 220.

The memory 220 comprises computer program code in the same way as the memory 120 of apparatus 100, but may also comprise other data. The processor 210 may receive data from the user interface 230, from the memory 220, or from the communication unit 250. Regardless of the origin of the data, these data may be outputted to a user of device 200 via the display device 240, and/or any other output devices provided with apparatus. The processor 210 may also store the data for later user in the memory 220.

Figure 3:
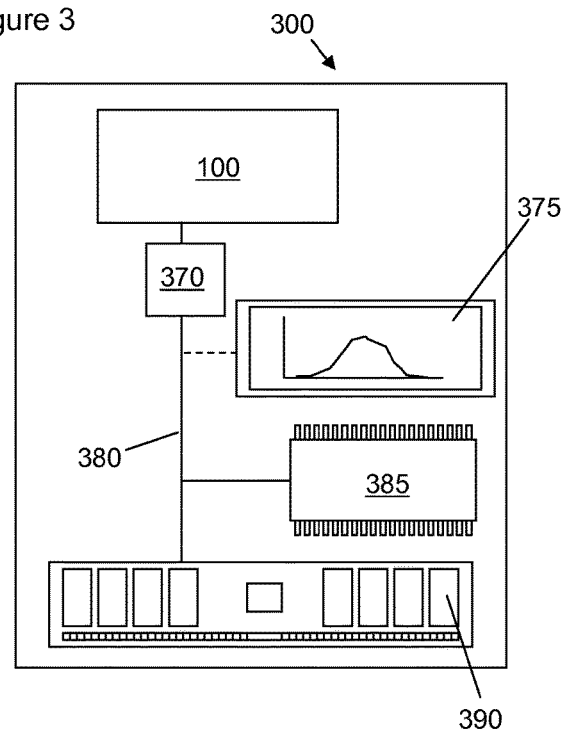
FIG. 3 illustrates a further example apparatus according to the present disclosure.

Device/apparatus 300 shown in FIG. 3 may be an electronic device (including a tablet personal computer), a portable electronic device, a portable telecommunications device, or a module for such a device. The apparatus 100 can be provided as a module for device 300, or even as a processor/memory for the device 300 or a processor/memory for a module for such a device 300. The device 300 comprises a processor 385 and a storage medium 390, which are electrically connected by a data bus 380. This data bus 380 can provide an active coupling between the processor 385 and the storage medium 390 to allow the processor 385 to access the computer program code.

The apparatus 100 in FIG. 3 is electrically connected to an input/output interface 370 that receives the output from the apparatus 100 and transmits this to the device 300 via data bus 380. Interface 370 can be connected via the data bus 380 to a display 375 (touch-sensitive or otherwise) that provides information from the apparatus 100 to a user. Display 375 can be part of the device 300 or can be separate. The device 300 also comprises a processor 385 that is configured for general control of the apparatus 100 as well as the device 300 by providing signalling to, and receiving signalling from, other device components to manage their operation.

The storage medium 390 is configured to store computer code configured to perform, control or enable the operation of the apparatus 100. The storage medium 390 may be configured to store settings for the other device components. The processor 385 may access the storage medium 390 to retrieve the component settings in order to manage the operation of the other device components. The storage medium 390 may be a temporary storage medium such as a volatile random access memory. The storage medium 390 may also be a permanent storage medium such as a hard disk drive, a flash memory, or a non-volatile random access memory. The storage medium 390 could be composed of different combinations of the same or different memory types.

FIGS. 4a-4g illustrate a particular discrete journal, a journal link created from content in the particular discrete journal, and sharing of the particular discrete journal by transmission of an electronic journal link which can be printed out.

The apparatus/device 400 is a portable electronic device such as a mobile telephone, tablet computer or PDA. The apparatus/device 400 is displaying a status bar 402 showing properties of the device which are not directly related to journals (such as the received signal strength, Bluetooth® connectivity, infra-red (IR) operation, remaining battery power and the current time. These are exemplary status bar indications only to show that the apparatus/device may be used for many other purposes other than creating journals and transmitting journal links.

The apparatus/device 400 is displaying a particular discrete journal called "London journal" 404. This journal relates to a discrete journal timeframe, as indicated in the title 404 as between 8-12 Oct. 2012. Only part of the total content of the journal can be displayed at any one time on the screen of the apparatus/device 400, and the user may view other content in the journal, for example, by scrolling up and down the screen. The apparatus/device 400 is currently displaying that on 8 October 408, the user received an SMS message 410 and took a series of photographs (e.g. 412) which are displayed as a montage in the journal. This montage also includes a still 414 from a movie recorded by the user (this item can be seen to be a movie as indicated by the "play" icon 470 displayed on the still 414). The user also recorded their current location (for example, using GPS location hardware/software of the apparatus/device 400) which is displayed on a map 416, and wrote a reply SMS message 418. Each item of user event content 410, 412, 414, 416, 418 is time-stamped as having been created/recorded/transmitted on 8 Oct. 2012, within the discrete journal timeframe of 8-12 Oct. 2012, so that time-stamped content may be included in the journal under the title "8 October" 408.

The example in FIG. 4a shows time-stamped user event image content of a user-captured movie still, a map showing a user location, and a user-captured photograph. Time-stamped user event image content may be considered to be the user event content of the journal pertaining to images, which may include photographs 412 and movie stills 414 displayed in the montage, and the map of the user location 416 in this example. In other examples, the time-stamped user event image content may comprises one or more of a pre-stored image (such as a stock photograph); a user-captured screenshot (such as of a game, document or website); a user-captured photograph of geographical scenery;

and a map image of a geographical location associated with a user-captured photograph of geographical scenery.

The particular discrete journal also comprises time-stamped user event non-image content taken from a plurality of user applications. The SMS messages 410, 418 sent and received in an SMS client may be considered to be non-image type content, or even in certain examples, be considered to be image type content. Other examples of such content include word processing documents from a word processing application, and e-mails sent and received in one or more e-mail clients.

FIG. 4b shows that the user has created a journal link 420. In this example the journal link includes the movie still 422, the user's location on a map 424 and a photograph 426. These items of user event image content 422, 424, 426 have been taken from the particular discrete journal in FIG. 4a (see elements 414, 416, 412). Thus the journal link 420 is itself formed from at least one of the time-stamped user event image content (in this example, three of the time-stamped user event content), from the particular discrete journal, for which the journal link 420 is configured to provide an electronic link. It may be imagined that the electronic journal link 420 is being displayed on a screen (not shown).

The movie still user event image content 422 may be considered to be a portion (that is, one still of the series of stills making up the movie) of the time-stamped user event image content which is the originating movie. The journal link 420 is itself formed from a plurality of the time-stamped user event image content 422, 424, 426 from the particular discrete journal for which the journal link 420 is configured to provide an electronic link. In this example, the journal link 420 is itself formed from respective portions of a plurality of time-stamped user event image content from the particular discrete journal for which the journal link is configured to provide an electronic link. That is, the movie still 422 may be considered to provide a portion of the originating movie user event image content, and there are a plurality of content (in this case, three items) in the journal link 420.

The created journal link 420, after any compilation and editing performed by the apparatus and/or user, comprises a single framed image compiled from time-stamped user event image content 422, 424, 426, including a portion thereof (the movie still 422 from a movie of the journal).

In FIG. 4c, the user (Jennie) has transmitted the journal link to a contact who has received the journal link on their smartphone 450 (of course, the recipient may be able to receive the journal link on any suitable receiving electronic device such as a laptop or desktop computer, mobile telephone, tablet computer, PDA, or other electronic device). The recipient's smartphone 450 is also displaying background information (the current date and day 452, and their current location and weather conditions 454).

The received journal link 460 has been received with a message 458 ("Jennie wants to share her journal with you") and the title and timeframe of the user's journal 456 ("London journal (8-12 Oct. 2012)") which the journal link 460 is associated with. The recipient has the option of enlarging 462 the received journal link 460. Other options may be possible, such as "compose SMS for sender", "compose e-mail to sender", "reply to sender" (that is, using the same type, or another type, of messaging which the user used to transmit the journal link to the recipient), or other options.

In FIG. 4d, the recipient has enlarged the received journal link 460 on their smartphone 450 so they can see the details of the journal link 460. The journal link 460 may be thought of as an electronic postcard, giving the recipient a taster of the user's journal (thus in this example, a taster of the user's trip to London). The received journal link 460 is displayed as a single framed image compiled from three items of user event image content. The recipient is unable to edit the journal link 460, the items 422, 424, 426 being grouped together a single object/frame. For example, the recipient is not able to move, add, change or delete any content in the journal link 460.

It may be imagined that if the recipient receives a journal link 460 (comprising a single framed image 460) on a portable electronic device such as a mobile phone, that the screen size of that electronic device may not be large enough to display the journal link 460 at full size. For example, if the journal link is created in a standard postcard size (for example, in the US this standard size may be 3½" (89 mm) by 5" (127 mm)), then this may be too large to be displayed at full size on the electronic device screen.

However, if the recipient receives the journal link 460 on an electronic device having a screen large enough to display the journal link at full size (for example, a tablet computer or desktop computer), then the journal link 460, 486 may be displayed in full (standard postcard) size. FIG. 4e shows that the recipient is using a different electronic device 480 such as a tablet computer to receive the journal link 486, and the apparatus 480 has a screen large enough to display the journal link 486 at full size (in this example standard postcard size 3½" (89 mm) by 5" (127 mm)). Apparatus 480 is also displaying the title 482 and journal timeframe 484 associated with the journal to which the received journal link 486 relates.

FIG. 4f shows that the user has chosen to automatically print the journal link 420 from apparatus 400 in a standard postcard size (in this example, 3½" (89 mm) by 5" (127 mm)) on a printer to obtain a printed compiled single framed image 485. FIG. 4g shows that on the reverse side of the printed compiled single framed image 485, the user has been able to enter a postal address of a recipient 496. The apparatus 400 may be able to enter a recipient address 496 automatically after receiving an indication of a recipient's name, for example by looking up the stored recipient address in a contact/address book stored on, or accessible by, the apparatus 400. The reverse side 490 of the printed compiled single framed image 485 may also include a phrase such as "post card" 494 and a place where a postal stamp may be affixed 492. In this way the user is able to send the compiled single framed image 485 in the post for postal delivery to the recipient, mimicking the sending of a traditional shop-bought postcard.

The apparatus/device 400 is configured to print the journal link 420 in a standard postcard size so that the user can quickly and easily print out a "postcard" of their journal link, which they may send to a friend. The recipient apparatus 450, 480 may also be configured to print out the journal link 485 automatically in a standard postcard size so that the recipient has a hard-copy of the received journal link. The user need not be concerned with having to resize the journal link in order to print it in a standard postcard size.

Looking back at FIGS. 4b-4e, the movie still 422 (indicated as being a movie still, as opposed to a photograph for example, by the "play" icon 470) may be an interactive element in the journal link. In this example, the time-stamped user event image content is a movie still 422, and user interaction with the movie still 422 will cause the originating movie to be played. That is, the user, using apparatus/device 400, and/or the recipient using receiving apparatus/devices 450, 480, may be able to interact (e.g.

single or double click on, touch, right-click and select an option from a menu, or other user interaction) with the movie still 422 to play the movie from which the still 422 was taken. In this way the user can send (and the recipient receive) an interactive journal link 420, 460, 486. In other examples, the recipient may not be able to interact with the movie still 422 and view the originating movie.

Another example of an interactive element which may be included in a journal link is if the time-stamped user event image content has an associated geographical location. This may be a photograph recorded as being taken at a particular location (e.g. a photograph of the Eiffel Tower may be labelled as containing an image of the Eiffel Tower). User interaction with this photograph may cause a map of the associated geographical location (the location of the Eiffel Tower, in Paris, France) to be displayed, with which the user may further interact (e.g. by scrolling around the map to examine different areas)). The label may be a stored property of the photograph. It may be added by the user manually labelling the photograph with a location, or the storage of the location may be automatic if the apparatus is able to determine its location using GPS, for example.

Another example of an interactive element in a journal link is the annotation of a journal link with an interactive journal tag. User interaction with the interactive journal tag may cause the user to view the corresponding particular discrete journal associated with the annotated journal link. That is, the user event image content in the journal link may be labelled as being taken from a particular journal in an interactive journal tag. The interactive journal tag may be displayed on the journal link (for example, in a footnote stating "Henry's Amazon journal © 2013", and clicking on/interacting with this link may cause Henry's Amazon journal to be displayed for viewing.

Another example of an interactive element in a journal link is the annotation of the journal link with a sender link. A recipient may be able to interact with the sender link (by, for example, touching or clicking it), and this interaction may cause a message-to-sender user interface to become available (such as an e-mail client with the "To:" field already completed with the sender's e-mail address, or a SMS client with a blank message ready to be completed, and with the sender's mobile telephone number already linked to the message). The user is able to compose and transmit a message to the sender of the journal link using the message-to-sender user interface, without necessarily having to enter the sender's contact details.

FIGS. 5a-5g illustrate different layouts of a journal link 500. FIGS. 5a to 5g all illustrate a journal link 500 comprising a single framed image compiled from one or more of the time-stamped user event image content or respective portions thereof. FIGS. 5b, 5c, 5e, 5f and 5g each show a plurality of the time-stamped user event image content, or respective portions thereof, arranged adjacent to one another in portrait or landscape format.

FIG. 5a shows a single item of portrait-oriented user event image content 502 as the journal link 500. FIG. 5b shows two items of user event image content 504, 508, separated by a horizontal boundary 506 (all boundaries shown in FIG. 5a-5g may or may not be explicitly shown in the journal link 500 e.g. as a line). FIG. 5c shows three items of user event image content 510, 514, 518, separated by two horizontal boundaries 512, 516. The journal link 500 itself has a defined border 520 around the perimeter of the frame, the defined border 520 acting as a defined visual frame for the time-stamped user event image content 512, 514, 518 contained therein. FIGS. 5a-5c show portrait-oriented journal links 500.

FIG. 5d shows a single item of landscape-oriented user event image content 522 as the journal link 500. FIG. 5e shows two items of user event image content 524, 528, separated by a vertical boundary 526. FIG. 5f shows three items of user event image content 530, 534, 538, separated by two vertical boundaries 532, 536. FIG. 5g shows three items of user event image content 540, 544, 548, separated by a vertical boundary 542 and a horizontal boundary 546. The journal link 500 in FIG. 5g itself has a defined border 550 around the perimeter of the frame, the defined border 550 acting as a defined visual frame for the time-stamped user event image content 540, 544, 548 contained therein. FIGS. 5d-5g show landscape-oriented journal links 500.

Figure 6A:
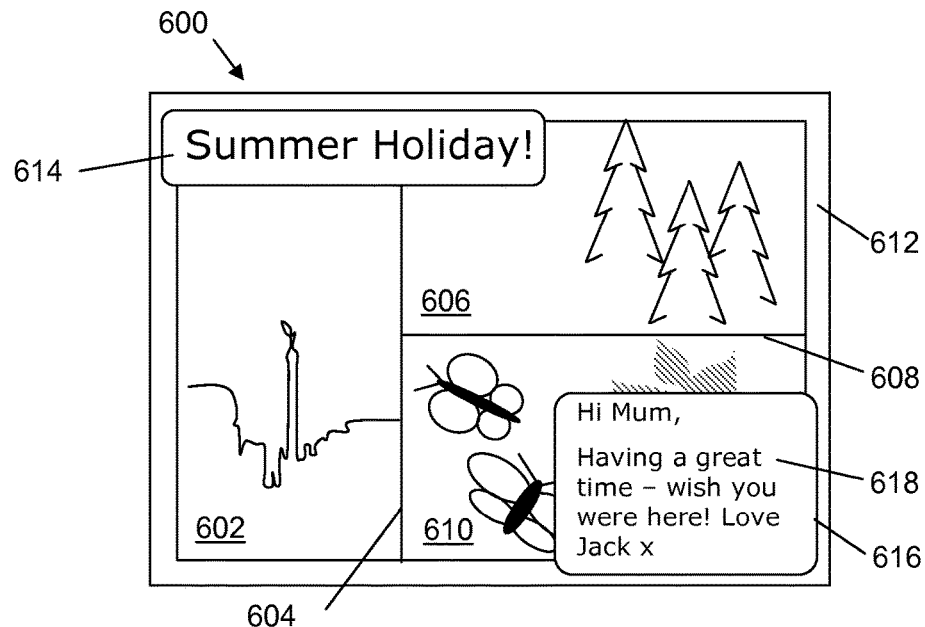
FIGS. 6a-6b illustrate annotated journal links.
Figure 6B:
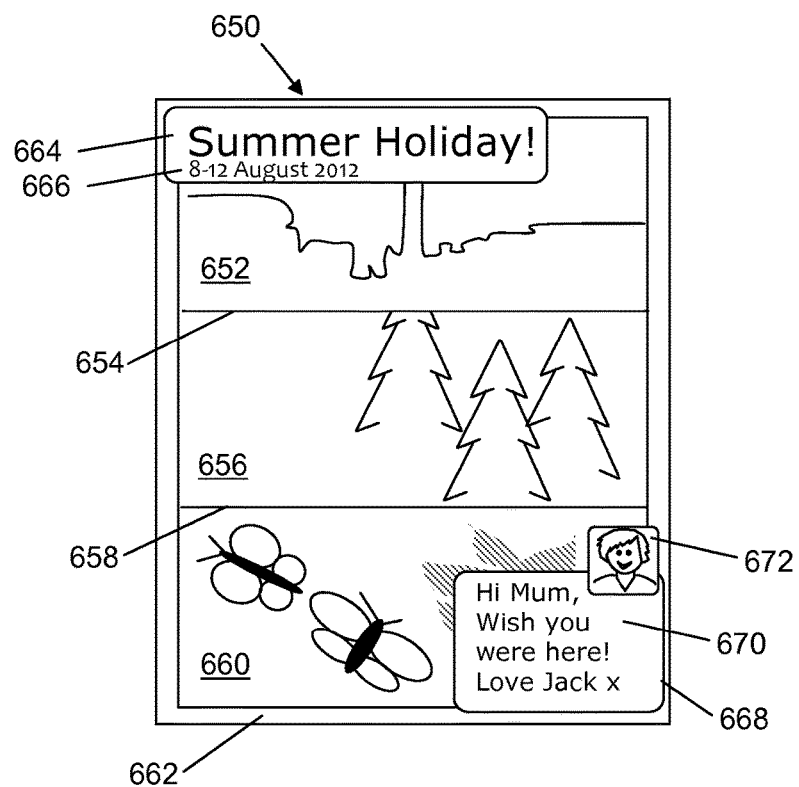

FIGS. 6a-6b show annotated journal links 600, 650. FIG. 6a shows a landscape annotated journal link 600. The user event image content 602, 606, 610 is separated by a vertical boundary 604 and a horizontal boundary 608 (the boundaries in FIGS. 6a and 6b may or may not be explicitly shown, e.g. as a line). The journal link itself 600 has a defined border 612 around the perimeter of the frame acting as a defined visual frame for the time-stamped user event image content 602, 606, 610 contained therein. The annotation of journal link 600 includes a title 614 and a textual message 618 included in a text box 616. The textual message 618 also features the sender name (Jack) and the recipient name (Mum).

FIG. 6b shows a portrait annotated journal link 650. The user event image content 652, 656, 660 is separated by two horizontal boundaries 654, 658. The journal link itself 650 has a defined border 662 around the perimeter of the frame acting as a defined visual frame for the time-stamped user event image content 652, 656, 660 contained therein. The annotation of journal link 600 includes a title 664, a journal timeframe 666, and a textual message 670 included in a text box 668. The textual message 670 also features the sender name (Jack) and the recipient name (Mum). A sender avatar 672 is also included in the annotation of the journal link 650. Other types of annotation which may be included in a journal link are a date, a time and a recipient avatar.

In FIGS. 6a and 6b, the journal link 600, 650 may be non-actuable such that upon the recipient receiving the journal link 600, 650, they cannot edit it or interact with it other than to view it. The recipient may not, for example, change which photographs or other items of user event image content they can see in the journal link 600, 650, or how they are seen from the user's journal. The recipient may not, for example, change how the user event image content in the journal link 600, 650 are framed, cropped, zoomed-in on, or change any artistic effects of the content. The recipient may also not annotate the journal link 600, 650 or change the existing annotation. The journal link 600, 650 is effectively locked to the recipient. The recipient may also not access the user's journal from which the content of the journal link 600, 650 was taken. The journal link 600, 650 is configured to not provide a link to access the time-stamped user event image content in the journal, for example by the recipient using an electronic device at a location remote to where the time-stamped user event image content of the particular discrete journal is stored. The journal link is essentially a fixed image proving a postcard-line preview of the user's journal.

In other examples, the electronic link (journal link displayed on an electronic device) to the particular discrete journal may be actuable. Actuation of the electronic link by a recipient may allow the recipient to access the time-stamped user event image content, for example to view all photograph, movies and location maps in a user's journal. Actuation of the electronic link by a recipient may allow the recipient to access the particular discrete journal with which the journal link is associated, for example to view the user's entire journal associated with the journal link. The recipient may be using an electronic device at a location remote to where the time-stamped user event image content of the particular discrete journal is stored when actuating the electronic journal link.

Figure 7A:
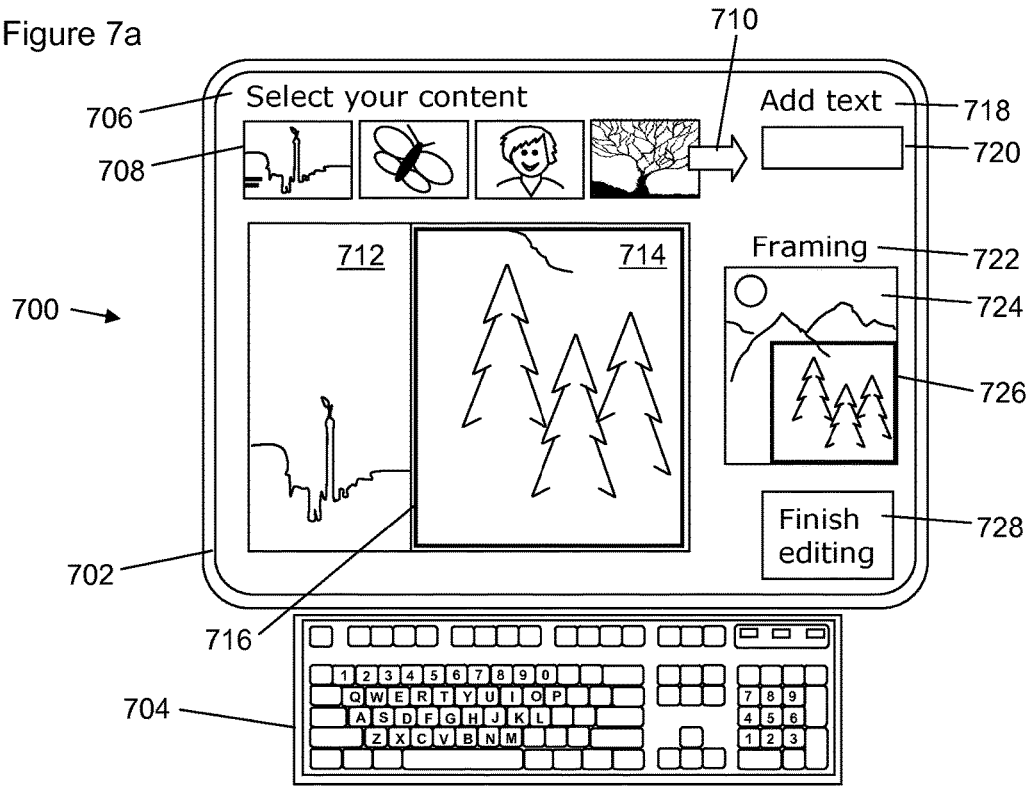
FIGS. 7a-7b illustrate a user editing a journal link prior to saving/transmission.
Figure 7B:
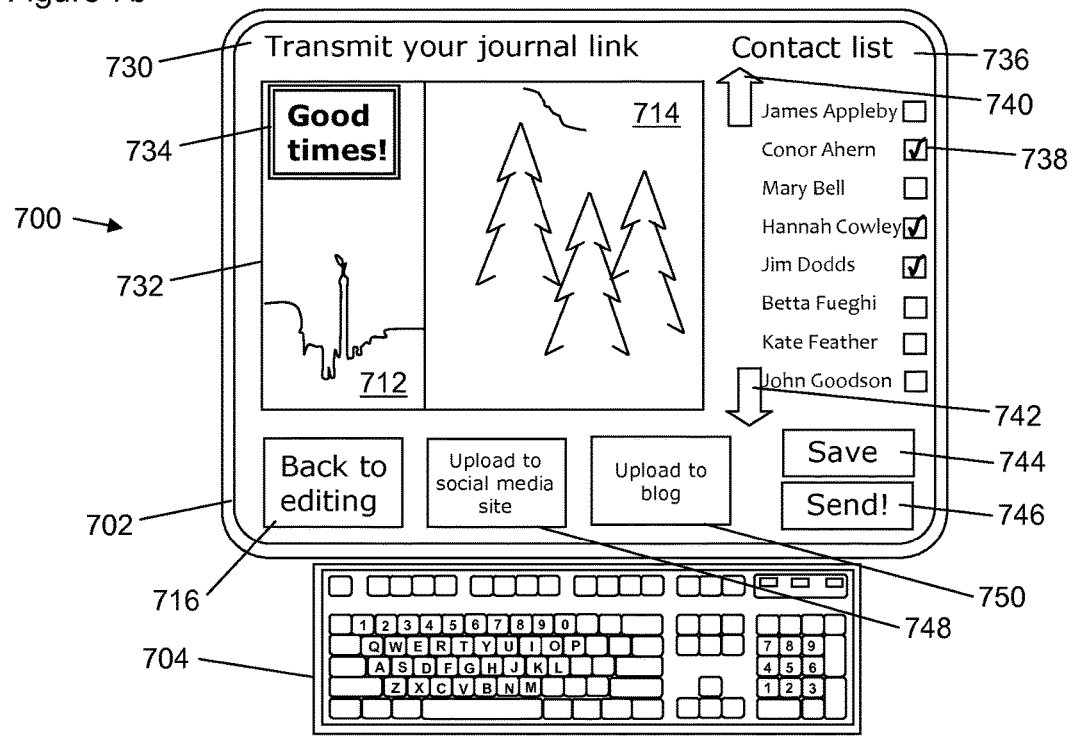

FIGS. 7a-7b illustrate a user using an electronic device 700 (which in this example is a desktop computer with a monitor 702 and an external keyboard 704, but could also be a laptop computer, a tablet computer, a mobile phone, a smartphone, a PDA, or another electronic device). The apparatus/device 700 is configured to form/create the journal link from the selected time-stamped user event image content.

The apparatus/device 700 may be configured to enable the creation of the journal link by presenting one or more of the time-stamped user event image content from the particular discrete journal for editing by a user, and the apparatus/device 700 may be configured to form/create the journal link 732 from the edited one or more of the time-stamped user event image content 712, 714. Such editing may include framing 722, cropping, changing the colour balance, adding an artistic effect, adding a fancy frame, or otherwise editing one or more items of user event image content or the journal link appearance as a whole.

FIG. 7a illustrates a user selecting content as invited to 706 by the apparatus/device 700. A selection of time-stamped user event image content 708 from the associated discrete journal is displayed so that the user can select what content is used in the journal link. If all the possible content cannot be displayed at once, the user may be able to scroll through a list of available content using, for example, a scrolling arrow 710. The user in this example has selected two photographs 712, 714. The frame 716 around photograph 714 shows that this photograph is currently selected for editing (in this example, framing). It can be seen that photograph 714 is showing a portion of the content of the full photograph 724 available in the journal and a portion 726 has been selected for inclusion in the journal link 732. It may be imagined that the user can drag the small frame in the Framing Editing Section 722 of the screen over the photograph 724 and the region within the frame such as region 726 will be displayed and included in the journal link (as photograph 714 in this example). The user may be able to annotate the journal link by adding text 718 using a text box 720. The journal link editing environment as displayed in FIGS. 7a and 7b may have many other editing features which are not illustrated but are known to those skilled in the art. Upon finishing creation of the journal link, the user may select the "Finish editing" button 728.

In FIG. 7b, the user has finished editing their journal link and is invited to transmit 730 their journal link 732. The user has added some annotation 734 to the journal link 732. The user has the options to go back 716 to the editing screen of FIG. 7a, upload the journal link 732 to a social media website 748, post a link to the journal link 732 on a blog (or microblog) 750, or select contacts from a stored address book or contact list 736 who can receive an electronic copy of the journal link 732. The user may be able to scroll 740, 742 through their contact list 736 and select 738 which contacts to send the journal link 732 to. The user may save their progress 744 at any time, and when happy with the journal link, may send/transmit 746 the journal link 732 to the selected contacts 738.

The apparatus/device 700 may be configured, rather than (or in addition to) a user selecting and compiling the content to form the journal link 732, to enable the creation of the journal link 732 by presenting one or more of the time-stamped user event image content from the particular discrete journal for selection by a user according to a predetermined selection criterion. For example, the apparatus may be configured to automatically generate a journal link 732 according to one or more predetermined criteria, and a user may be able to subsequently edit this automatically generated journal link before transmission, such as shows in FIG. 7a.

The predetermined selection criterion for presentation of one or more of the time-stamped user event image content for selection by a user to create a journal link may comprise: presentation of the most recently available time-stamped user event image content in the particular discrete journal; presentation of the most viewed time-stamped user event image content in the particular discrete journal, and presentation of time-stamped user event image content designated as favourite time-stamped user event image content in the particular discrete journal.

The most recently available time-stamped user event content may be, for example, the last 10 user event image content items recorded having a time-stamp within the journal timeframe of the particular discrete journal, or may be the last 20 recorded photographs having time-stamps within the journal timeframe of the particular discrete journal. The most viewed time-stamped user event image content may be the photographs, movies, and maps in the journal which the user has selected to view most often (such as a favourite photo or a memorable movie). Favourite time-stamped user event content may be designated as "favourite" by the user electronically marking their favourite content, for example, by choosing a "select as favourite" option in a menu associated with a particular item of user event image content.

The apparatus/device 700 may also be configured to enable the automatic compilation of the time-stamped user event image content from the particular discrete journal to form the journal link 736 according to a predetermined compilation criterion. The predetermined compilation criterion may comprise compiling a preset number of the time-stamped user event image content from the particular discrete journal. A preset number may be for example, three items of user event image content to be used to form the journal link. Of course, the preset number may be one, two, four, or more items. The predetermined compilation criterion may comprise compiling the time-stamped user event image content from the particular discrete journal in a preset layout. For example, the preset layout may be, for example, three portrait-oriented strips forming a landscape-oriented journal link such as shown in FIG. 5f. Many different preset layouts may be envisaged (see FIGS. 5a-5g for an exemplary selection).

The predetermined compilation criterion may comprise consideration of the content of the time-stamped user event image content from the particular discrete journal. Consideration of the content may be, for example, selection of photographs only (and not movie stills, location maps, or other image content) to be put together to form the journal link. Another example may be to automatically include photographs in which particular contacts (e.g. favourite contacts, or contacts mentioned in the journal to which the journal link is related) have been detected by the apparatus via, for example, facial recognition software. For example, Amy, Ben and Chris may be mentioned in a journal (they may have sent an SMS, MMS or e-mail to the user, they may have been included as new contacts in the timeframe of the journal, or they may have been mentioned in a social media post made and included in the journal). The apparatus may be able to automatically detect Amy, Ben and Chris in any photographs included in the journal by face-recognition software, for example, and present these photographs for inclusion in the journal link.

Another example may be to present content designated as favourite content before presenting other non-favourite content for inclusion in the journal link. The predetermined compilation criterion may comprise consideration of an associated geographical location for the time-stamped user event image content from the particular discrete journal. Consideration of an associated geographical link may be, for example, selecting content which is detected by the apparatus as having a feature closely associated with a particular location. For example, a journal link for a journal entitled "Copenhagen weekend" may consider maps showing locations in Copenhagen, and photographs labelled with the names "Copenhagen" and "Denmark" for inclusion in the journal link.

If the user selects the "save" option 744, then the user may be able to return later and continue editing/creating the journal link. In other examples, an option may be presented (e.g. "Done") and selection of this option may store the journal link as a non-editable image/file/object to be transmitted later to one or more contacts. That is, the journal link may not be edited any further after selection of such an option, for example, to decompile the compiled user event image content.

The apparatus/devices 100, 200, 300, 400, 700 may be configured to enable the creation of the journal link for onward transmission to the recipient by one or more of an MMS transmission, e-mail transmission, Bluetooth® transmission, NFC transmission, WLAN transmission, radio wave transmission and cellular radio transmission.

FIG. 8a shows that the apparatus is in communication with a remote server. FIG. 8b shows that the apparatus is in communication with a "cloud" for cloud computing. In FIGS. 8a and 8b, apparatus 800 (which may be apparatus 100, 200, 300) is in communication with 808 a display 802 displaying a journal or journal link. Of course the apparatus 800 and display 802 may form part of the same apparatus/device (such as devices 400, 700), although they may be separate as shown in the figures. The apparatus 800 is also in communication 806 with a remote computing element. Such communication may be via a communications unit 250, for example. FIG. 8a shows the remote computing element to be a remote server 804, with which the apparatus 800 may be in wired or wireless communication (e.g. via the internet, Bluetooth®, a USB connection, or any other suitable connection as known to one skilled in the art). In FIG. 8b, the apparatus 800 is in communication with a remote cloud 810 (which may, for example, by the Internet, or a system of remote computers configured for cloud computing). It may be that the journal link and/or the associated journal and/or at least some user event content and/or at least some user applications are stored/run/created at the remote computing element 804, 810 and accessed by the apparatus 800 for display 802 as a journal and/or journal link. The user applications and user event content need not all be stored at the same location. Some or all of the user applications and/or user event content may be stored at the apparatus 100, 200, 300, 800. Some or all of the user applications and/or user event content may be stored at the remote computing element 804, 810. The apparatus 800, 802 may actually form part of the remote sever 804 or remote cloud 810.

The apparatus has been shown in the figures as a portable electronic device, a mobile telephone, a smartphone, a tablet computer, a personal digital assistant, a laptop computer and a desktop computer. The apparatus may in other examples be a media player, a non-portable electronic device, a server, or a module/circuitry for one or more of the same.

FIG. 9 shows a flow diagram illustrating a method of creating a journal link for a recipient of the journal link, the journal link configured to provide an electronic link to a particular discrete journal, the particular discrete journal relating to a discrete journal timeframe and comprising time-stamped user event image content with time-stamps within the discrete journal timeframe, wherein the journal link is itself formed from at least one of the time-stamped user event image content from the particular discrete journal for which the journal link is configured to provide an electronic link 902 and is self-explanatory.

FIG. 10 illustrates schematically an example comprising a computer/processor readable medium 1000 providing a computer program. In this example, the computer/processor readable media is a disc such as a digital versatile disc (DVD) or a compact disc (CD). In other examples, the computer readable media may be any media that has been programmed in such a way as to carry out an inventive function.

The terms "journal" and "discrete journal" are used interchangeably in this disclosure, such that references to a journal imply that the journal is a discrete journal with a particular timeframe. Also, user event content in this disclosure should be taken to be time-stamped user event content, even if it is not explicitly labelled as being time-stamped. Similarly the term "user event image content" and "time-stamped user event image content" are used interchangeably with the assumption that all user event image content has a corresponding time stamp associated with it.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects may consist of any such individual feature or combination of features. In view of the foregoing description it will be evident to a person skilled in the art that various modifications may be made within the scope of the disclosure.

While there have been shown and described and pointed out fundamental novel features of the disclosure as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or example may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:
1. An apparatus comprising:
at least one processor; and
at least one memory including computer program code, the at least one memory and the computer program code configured to, with the at least one processor, cause the apparatus to perform at least the following:
in respect of a particular discrete journal relating to a discrete journal timeframe, the particular discrete journal comprising a plurality of simultaneously displayed types of time-stamped user event content with time-stamps within the discrete journal timeframe, the plurality of types of time-stamped user event content selected from a plurality of photos; videos; maps; screenshots; sound files; documents; e-mails; messages; music playlists; web page bookmarks; e-books; contact information, and calendar entries;
enable the creation of a journal link for a recipient of the journal link, the journal link configured to provide an electronic link to all content in the particular discrete journal;
wherein the journal link is itself formed from at least one item of time-stamped user event image content of the time-stamped user event content from the particular discrete journal for which the journal link is configured to provide an electronic link.

2. An apparatus according to claim 1, wherein the journal link is itself formed from at least a portion of one or more of the time-stamped user event image content from the particular discrete journal for which the journal link is configured to provide an electronic link.

3. An apparatus according to claim 1, wherein the particular discrete journal comprises the time-stamped user event image content taken from a plurality of user applications.

4. An apparatus according to claim 1, wherein the journal link is itself formed from a plurality of he time-stamped user event image content from the particular discrete journal for which the journal link is configured to provide an electronic link.

5. An apparatus according to claim 1, wherein the journal link is itself formed from one or more of: a plurality of, and respective portions of a plurality of, the time-stamped user event image content from the particular discrete journal for which the journal link is configured to provide an electronic link.

6. An apparatus according to claim 1, wherein the particular discrete journal comprises the time-stamped user event image content taken from a plurality of user applications, the particular discrete journal relating to a discrete journal timeframe and comprising the time-stamped user event image content with time-stamps within the discrete journal timeframe, and
wherein the journal link is itself formed from a plurality of the time-stamped user event image content from the particular discrete journal for which the journal link is configured to provide an electronic link.

7. An apparatus according to claim 1, wherein the journal link comprises a single framed image compiled from one or more of the time-stamped user event image content or respective portions thereof.

8. An apparatus according to claim 1, wherein the journal link, once formed, is configured to be non-editable.

9. An apparatus according to claim 1, wherein the journal link comprises a single framed image compiled from a plurality of the time-stamped user event image content or respective portions thereof.

10. An apparatus according to claim 9, wherein the plurality of the time-stamped user event image content, or respective portions thereof, are arranged adjacent to one another in portrait or landscape format.

11. An apparatus according to claim 1, wherein the journal link comprises a single framed image compiled from one or more of the time-stamped user event image content or respective portions thereof, with a defined border around the perimeter of the frame, the defined border acting as a defined visual frame for the time-stamped user event image content contained therein.

12. An apparatus according to claim 1, wherein the journal link comprises a single framed image compiled from one or more of the time-stamped user event image content or respective portions thereof, and wherein the journal link is configured to be at least one of automatically displayed on an electronic device in a standard postcard size or automatically printed by a printer in a standard postcard size.

13. An apparatus according to claim 12, wherein the apparatus is configured to enable the entry of a postal address to be included on the reverse of the printed compiled single framed image to allow for postal delivery of the printed compiled single framed image as a printed standard postcard-size journal link.

14. The apparatus of claim 1, wherein the apparatus is configured to enable annotation of the journal link to create an annotated journal link, wherein annotation of the journal link comprises including one or more of a title, a date, a time, a textual message, a sender name, a recipient name, a sender avatar, and a recipient avatar with the journal link.

15. An apparatus according to claim 1, wherein the electronic link to the particular discrete journal is non-actuable, and is configured to not provide a link to access the time-stamped user event image content using an electronic device at a location remote to where the time-stamped user event image content of the particular discrete journal is stored.

16. An apparatus according to claim 1, wherein the electronic link to the particular discrete journal is actuable, and wherein actuation of the electronic link by a recipient allows the recipient to access one or more of:
   the time-stamped user event image content; and
   the particular discrete journal with which the journal link is associated;
   using an electronic device at a location remote to where the time-stamped user event image content of the particular discrete journal is stored.

17. An apparatus according to claim 1, wherein the apparatus is configured to enable the creation of the journal link by presenting one or more of the time-stamped user event image content from the particular discrete journal for selection by a user according to a predetermined selection criterion, and wherein the apparatus is configured to form the journal link from the selected time-stamped user event image content.

18. The apparatus of claim 17, wherein the predetermined selection criterion for presentation of one or more of the time-stamped user event image content for selection by a user to create a journal link comprises:
   presentation of the most recently available time-stamped user event image content in the particular discrete journal;
   presentation of the most viewed time-stamped user event image content in the particular discrete journal; and
   presentation of time-stamped user event image content designated as favourite time-stamped user event image content in the particular discrete journal.

19. An apparatus according to claim 1, wherein the apparatus is configured to enable the automatic compilation of the time-stamped user event image content from the particular discrete journal to form the journal link according to a predetermined compilation criterion.

20. The apparatus of claim 19, wherein the predetermined compilation criterion comprises:
   compiling a preset number of the time-stamped user event image content from the particular discrete journal;
   compiling the time-stamped user event image content from the particular discrete journal in a preset layout;
   consideration of the content of the time-stamped user event image content from the particular discrete journal; and
   consideration of an associated geographical location for the time-stamped user event image content from the particular discrete journal.

21. An apparatus according to claim 1, wherein the apparatus is configured to enable the creation of the journal link by presenting one or more of the time-stamped user event image content from the particular discrete journal for editing by a user, and wherein the apparatus is configured to form the journal link from the edited one or more of the time-stamped user event image content.

22. An apparatus according to claim 1, wherein the time-stamped user event image content comprises one or more of:
   a pre-stored image;
   a user-captured photograph;
   a user-captured movie still;
   a user-captured screenshot;
   a map image of a geographical location;
   a user-captured photograph of geographical scenery; and
   a map image of a geographical location associated with a user-captured photograph of geographical scenery.

23. An apparatus according to claim 1, wherein the journal link is configured to be uploadable to a social media service.

24. An apparatus according to claim 1, wherein the apparatus is configured to enable the creation of the journal link for onward transmission to the recipient by one or more of an MMS transmission, e-mail transmission, Bluetooth® transmission, NFC transmission, WLAN transmission, radio wave transmission and cellular radio transmission.

25. The apparatus of claim 1, wherein the apparatus is configured such that the journal link comprises one or more interactive elements.

26. The apparatus of claim 25, wherein the one or more interactive elements of the journal link comprise one or more of:
   the time-stamped user event image content which is a movie still, wherein user interaction with the movie still causes the originating movie to be played;
   the time-stamped user event image content having an associated geographical location, wherein user interaction with the time-stamped user event image content causes a map of the associated geographical location to be displayed;
   annotation of the journal link comprising an interactive journal tag, wherein user interaction with the interactive journal tag causes the user to view the corresponding particular discrete journal associated with the annotated journal link; and
   annotation of the journal link comprising a sender link, wherein user interaction with the sender link causes a message-to-sender user interface to become available, and wherein the user is able to compose and transmit a message to the sender of the journal link using the message-to-sender user interface.

27. The apparatus of claim 1, wherein the apparatus is a portable electronic device, a mobile telephone, a smartphone, a tablet computer, a personal digital assistant, a laptop computer, a media player, a non-portable electronic device, a desktop computer, a server, or a module/circuitry for one or more of the same.

28. A method comprising:
- in respect of a particular discrete journal relating to a discrete journal timeframe, the particular discrete journal and comprising a plurality of simultaneously displayed types of time-stamped user event content with time-stamps within the discrete journal timeframe, the plurality of types of time-stamped user event content selected from a plurality of: photos; videos; maps; screenshots; sound files; documents; e-mails; messages; music playlists; web page bookmarks; e-books; contact information, and calendar entries;
- creating a journal link for a recipient of the journal link, the journal link configured to provide an electronic link to all content in the particular discrete journal;
- wherein the journal link is itself formed from at least one item of time-stamped user event image content of the time-stamped user event content from the particular discrete journal for which the journal link is configured to provide an electronic link.

29. A non-transitory computer readable medium comprising computer program code stored thereon, the computer readable medium and computer program code being configured to, when run on at least one processor, cause an apparatus to perform at least the following:
- in respect of a particular discrete journal relating to a discrete journal timeframe, the particular discrete journal comprising a plurality of simultaneously displayed types of time-stamped user event content with time-stamps within the discrete journal timeframe, the plurality of types of time-stamped user event content selected from a plurality of: photos; videos; maps; screenshots; sound files; documents; e-mails; messages; music playlists; web page bookmarks; e-books; contact information, and calendar entries;
- enable the creation of a journal link for a recipient of the journal link, the journal link configured to provide an electronic link to all content in the particular discrete journal;
- wherein the journal link is itself formed from at least one item of time-stamped user event image content of the time-stamped user event content from the particular discrete journal for which the journal link is configured to provide an electronic link.

* * * * *